United States Patent [19]

Doller

[11] Patent Number: 4,727,352
[45] Date of Patent: Feb. 23, 1988

[54] AXLE WEIGHT LOAD INDICATOR DEVICE

[76] Inventor: Jerry A. Doller, 830 Franklin Rd., Lebanon, Ohio 45036

[21] Appl. No.: 26,453

[22] Filed: Mar. 17, 1987

[51] Int. Cl.[4] .................. B60Q 1/00; B60K 28/00
[52] U.S. Cl. .................. 340/52 R; 340/665; 340/666; 340/686; 180/290; 180/905; 200/61.42; 200/61.44; 200/85 R
[58] Field of Search .............. 340/52 R, 61, 665–668, 340/686; 301/124 R; 200/61.42, 61.44, 85 R, DIG. 35; 180/199, 271, 273, 290, 905, 906

[56] References Cited

U.S. PATENT DOCUMENTS

| | | | |
|---|---|---|---|
| 2,769,967 | 11/1956 | Lukocevich | 340/666 |
| 3,718,792 | 2/1973 | Stagner | 340/52 R |
| 3,973,804 | 8/1976 | Engfer et al. | 180/290 |
| 4,086,576 | 4/1978 | Jebb et al. | 340/52 R |

*Primary Examiner*—Donnie L. Crosland
*Attorney, Agent, or Firm*—Charles R. Wilson

[57] ABSTRACT

An axle weight load indicator device for mounting on a motor vehicle to detect when a pre-set axle weight has been exceeded. The device includes an electrical switch, an axle-mounted permanent stop and a retractable probe mounted in a housing which is operably associated with the electrical switch and permanent stop. When not in use, the probe is retracted into the housing to ensure that false signals are not emitted during movement of the motor vehicle. When operable, the probe is positioned to make contact with the permanent stop when a pre-set load limit has been exceeded. Continued loading causes activation of the electrical switch. The electrical switch trips an alarm to warn of the excess load.

16 Claims, 16 Drawing Figures

AXLE WEIGHT LOAD INDICATOR DEVICE

This invention relates to an overload indicator device for use on motor vehicles. More particularly, the invention relates to a load indicator intended for use on large vehicles such as trucks, trailors and the like for determining when a pre-set axle weight load limit has been exceeded.

BACKGROUND OF THE INVENTION

State highway codes of all the states contain legal weight limits for vehicles using the respective roads. These weight limits are established to prevent damage to the pavement and roadbed as well as for safety reasons. The weight limits are normally defined in terms of the maximum allowable pay load for each axle of the vehicle. Most states have check stations along the highways at key points to detect violations of any legal weight limit. The vehicles are required to be driven onto scales wherein the weight limit on each axle is determined. It is possible that the total weight contained within the motor vehicle is within limits. However, the load may be so unbalanced as to cause an overweight on one or more of the axles. If a vehicle is found to be illegally loaded, it is detained until another vehicle can be dispatched to remove part of the load. In addition, the driver is normally fined.

Trucking companies as well as drivers desire to load as much cargo into the truck as legally permissible for economic reasons. Drivers have for the most part learned to balance a load within their trucks. This is gained by experience. Many drivers have learned it is difficult to load a vehicle in a balanced manner. Generally, there is a certain degree of trial and error imposed. Any mistake can be costly. Accordingly, most drivers tend to underload their vehicles.

The need for an overload indicator has been recognized. Various people have attempted to devise idicator devices which can be permanently attached to a vehicle bed so as to determine when a preset load level has been approached or exceeded. Known overload indicator devices are primarily comprised of two parts. One part is attached to the underside of the motor vehicle while the second part is attached to the axle. As additional weight is added to the vehicle, the bed is gradually forced downward until a pre-set limit has been exceeded. At that point contact points of the indicator device touch and set off an alarm of some type. A major draw back with devices of this type is that even though a motor vehicle has been loaded and balanced so as to be within legal limits false readings can occur as the vehicle travels down the road. Unevenness of the surface roadways will cause a certain degree of bouncing of the vehicle. This bouncing will cause the springs to compress and, in effect, cause the contact points of the indicator device to come together and set off the alarm. This false reading can be very annoying to the driver. An on/off switch in the cabs on the motor vehicles has been provided to avoid this. This does avoid one problem; however, the life of the indicator device is substantially reduced when such inadvertent contacts are continually made.

There is a definite need for an axle weight overload indicator device. Such a device must be easy to install and provide accurate readings. The device must also be built so as to withstand continued use over a long period of time. In accord with this need, there has been developed an axle weight overload indicator device.

SUMMARY OF THE INVENTION

An axle weight load indicator device is adapted for ready attachment to a motor vehicle. The indicator device comprises a pemanent stop mounted on a axle of the motor vehicle and a housing with an electrical switch and a retractable probe mounted on the underside of the motor vehicle in operable association with the stop. The probe is connected to a power source which allows it to be retracted during non-use. An alarm means is also provided for signaling when a preset load limit has been exceeded. After the motor vehicle is legally loaded, the contact probe is retracted into the housing and substantially out of the way so as to prevent damage during operation of the motor vehicle.

DETAILED DESCRIPTION OF THE INVENTION

Figures 1, 5, 10:
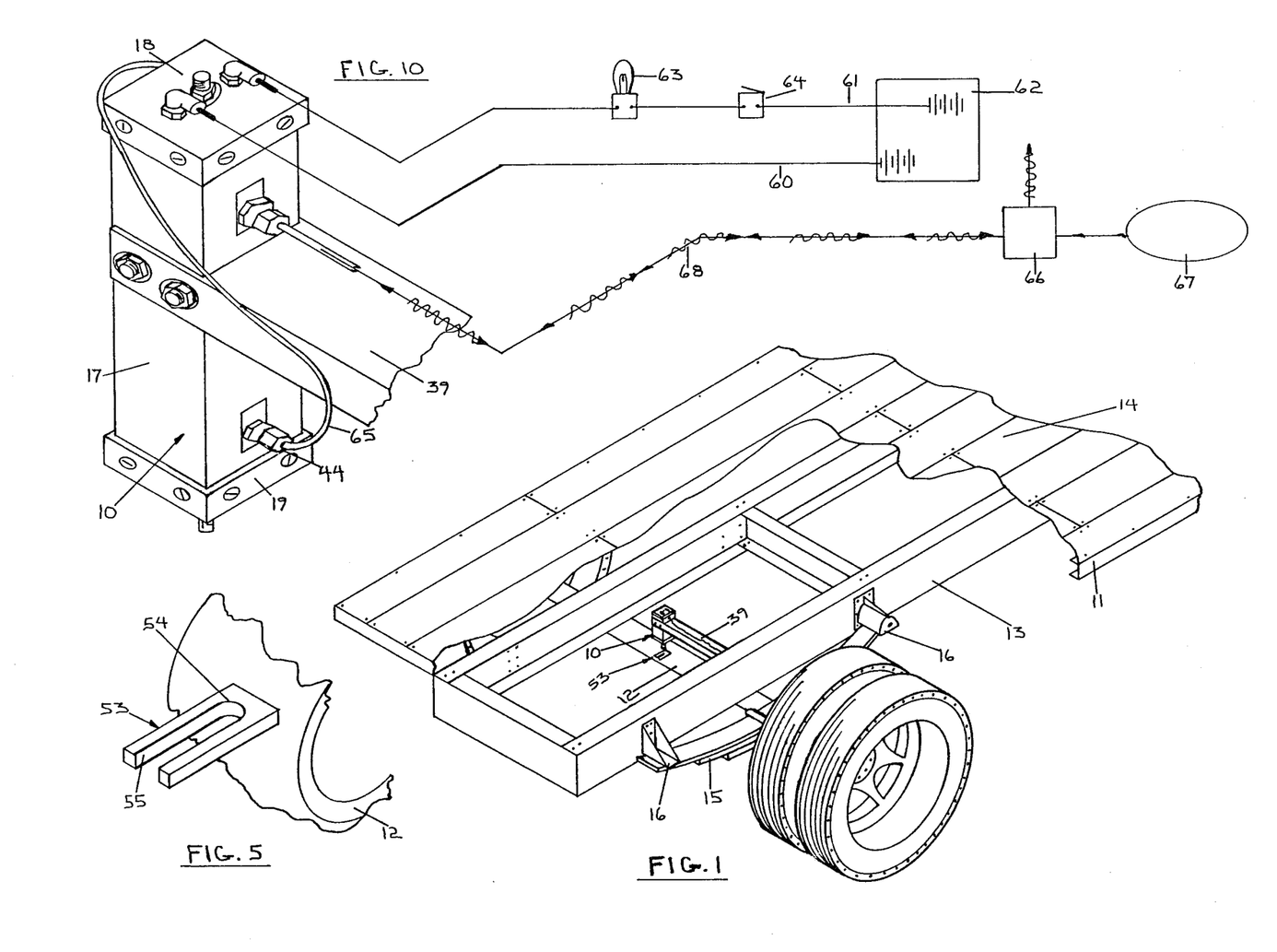
FIG. 1 is a view in perspective of a motor vehicle utilizing the axle weight overload indicator device of this invention.
FIG. 5 is a view in perspective of a permanent stop as mounted on an axle section.
FIG. 10 is a schematic diagram of the indicator device of this invention showing the wiring and air supply source.

The load indicator device 10 of this invention is shown generally in FIG. 1 and in detail in FIGS. 2-9. With reference to FIG. 1 there is shown a view of a portion of a load-bearing motor vehicle 11. Such vehicles have at least two axles, and can typically have eight or more axles. Each axle will be limited as to the load which it can bear without exceeding mandated limits.

Accordingly, the device of this invention while only shown on axle 12 will be used on each axle for which a load limit is imposed. The motor vehicle has a frame 13 on which is positioned a bed 14. Leaf springs 15 are permanently attached to the frame 13 by shackles 16 and also to the axle 12. The load indicator device 10 is mounted on the underside of the motor vehicle's bed and axle.

Figure 2:
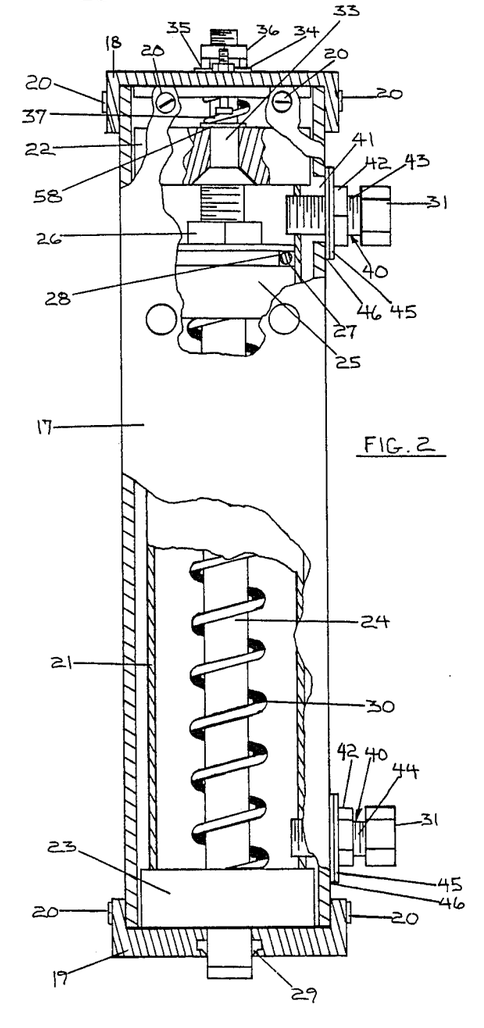
FIG. 2 is a side view of the indicator device of this invention with a partial cutaway showing the inside of a cylinder with a probe.
Figure 3:
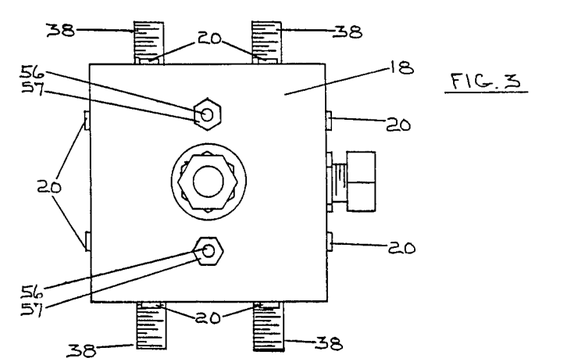
FIG. 3 is a top view of the indicator device of FIG. 2.
Figure 4:
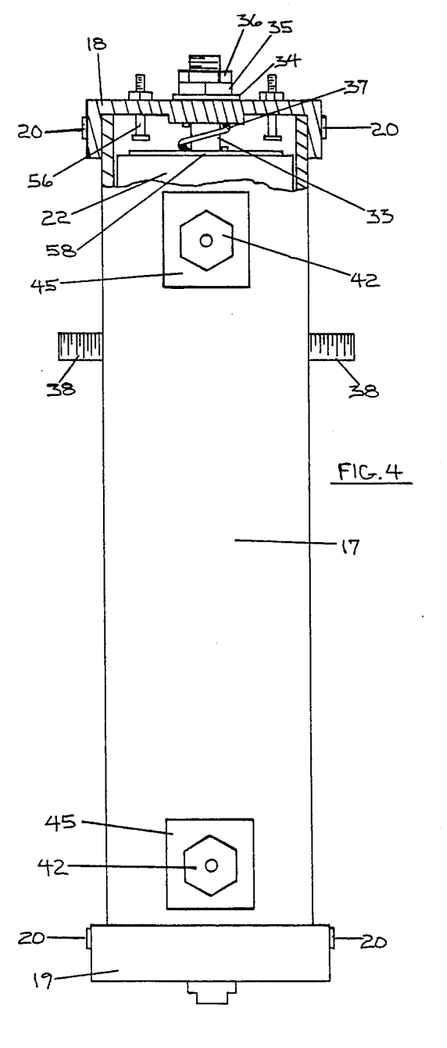
FIG. 4 is a front view of the indicator device of FIG. 2.

FIGS. 2-4 show one part of the load indicator device in detail. A housing 17 has a top cover 18 and a bottom cover 19. Conventional attachment means such as self-threading screws 20 are used to hold the covers to the housing. A sliding cylinder 21 mounted within the housing has a cylinder top 22 and cylinder bottom 23. A piston rod 24 mounted within the cylinder 21 acts as a probe during operation. The piston rod extends the length of the cylinder and out through appropriately sized holes in the cylinder bottom 23 and bottom cover 19. The piston rod is secured to a piston 25 by a nut 26 at it's upper threaded extremity. An O-ring 27 is provided in groove 28 to ensure a tight seal within the cylinder during operation. A rod wiper 29 of a resilient material is also provided in the hole in the bottom cover 19 as an aid in sliding movement of the piston rod. A coil spring 30 extends the length of the piston rod from the cylinder bottom 23 to the piston 25.

Piston 25 is dimensioned to fit within the sliding cylinder 21 and respond to a force such as air pressure to cause its downward movement in the cylinder. For this purpose, a conventional air supply source typically found on larger motor vehicles, e.g. tractor-trailors is connected to the cylinder 21 by means of an union 31. Sealing means are provided at the point where the air hose enters the union 31 to ensure an air tight seal. Coil spring 30 contracts when piston 25 is forced downwardly and returns to rest position when the force is removed, therby retracting the probe at least partially back into the sliding cylinder 21.

A master bolt 33 extends through the cylinder top 22 and the top cover 18. Securing means comprised of a washer 34, adjustment nut 35, and half-nut 36 are used to hold the cylinder 21 in the housing at a pre-set rest position. A coil spring 37 is positioned around the master bolt 33 in the space created between the cylinder top 22 and housing top cover 18. As explained in the operation of the device, the coil spring 37 ensures that sliding cylinder 21 will return to its rest position during nonuse.

Attachment means are provided for attaching the housing to the underside of the motor vehicle's bed. Bolts 38 with nuts and brackets 39 are used. Other conventional attachment means can be used for permanently mounting the housing. As evident from FIG. 1, normally the housing will be mounted at the mid-point of the axle. If need be, a J channel extending across the underside of the motor vehicle can first be attached and then the housing slid along the J channel until the desired lateral position is reached.

Slidable hold means 40 comprised of threaded rods 43 and 44 and nuts 42 extending through elongated slots 41 in the side-wall of housing are permanently attached to the cylinder 21. The nuts 42 are tightened sufficiently to hold the cylinder 21 in a spaced sliding relationship with the housing 17. Preferably, rods 43 and 44 are hollow and serve the dual purpose of holding and supplying compressed air to the cylinder. The compressed air enters through rod 43 and air from action of the piston exits through rod 44. The threaded rods pass through elongated slots 41 in the housing. The elongated slots permit limited vertical movement of the cylinder within the housing as described below. Metal back-up plates 45 and rubber gaskets 46 positioned over the elongated slots help to keep the sliding cylinder in a clear working condition.

Figure 6:
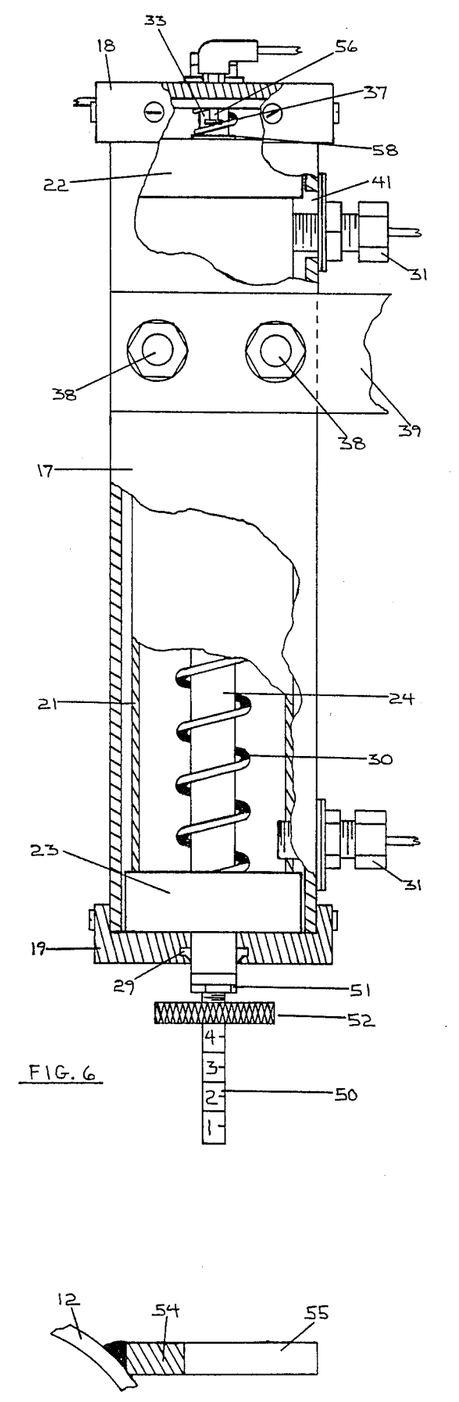
FIG. 6 is a side view with a partial cutaway of the indicator device of FIG. 2 when the probe is retracted.

An adjustable indicator stop 50 best shown in FIG. 6 is threaded into the end of piston rod 24 a desired distance and secured by jam half nut 51. The indicator stop 50 is calibrated as a means of warning when a pre-set load limit is about to be reached. A shoulder 52 extending axially from the indicator stop effectively prevents further movement of the piston rod 24 when contact is made with an axle mounted permanent stop.

With reference to FIG. 5 a pemanent stop 53 is mounted on the axle 12 so as to be in alignment with the above described piston rod and indicator stop 50. A conventional attachment means such as spot welds hold the permanent stop 53 in position to withstand a downward force exerted by the piston rod. The stop 53 comprises an elongated plate 54 with an open-ended slot 55 extending from its outer extremity towards the axle. The slot 55 has a width less than that of the indicator stop's shoulder 52. As readily apparent, the housing and permanent stop are mounted so that the housing clears the axle when lowered.

Contact studs 56 are mounted with the aid of jam nuts 57 on the underside of top cover 18. Such studs extend through the top cover and lead to a power source. An electrically conducting contact plate 58 is positioned on the cylinder top 22 for completing a circuit between the contact studs. In effect, contact studs 56 and contact plate 58 constitute an electrical switch.

FIG. 6 shows the indicator device when in a rest position. That is, no air pressure is being supplied to the sliding cylinder 21. As such, the piston rod 24 is retracted into the cylinder 21 due to coil spring 30's force. The adjustment indicator stop 50 is at its top most position. Coil spring 37 forces the sliding cylinder downwardly to the lower edge of slots 41 in the housing 17 side walls. In this position, the indicator stop 50 is safely distanced from the permanent stop 53 so that no inadvertent contact is possible. Contact studs 56 and contact plate 58 are not touching.

Figure 7:
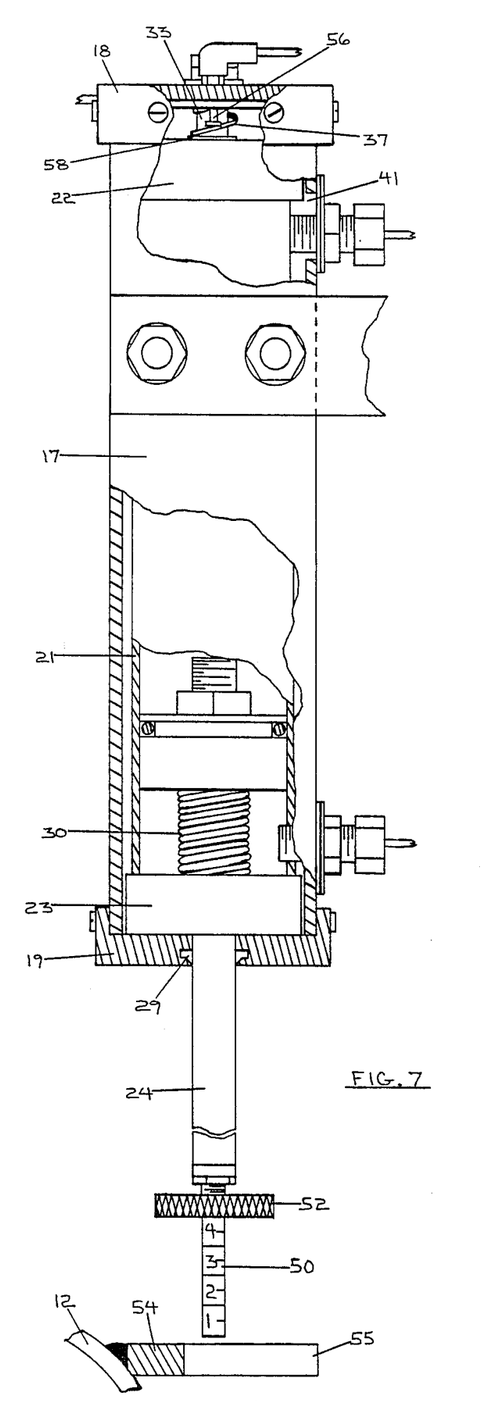
FIGS. 7 and 8 are side views with partial cutaways of the indicator device of FIG. 2 with a partial cut-away depicting the device when part-loads are experienced.
Figures 8, 9:
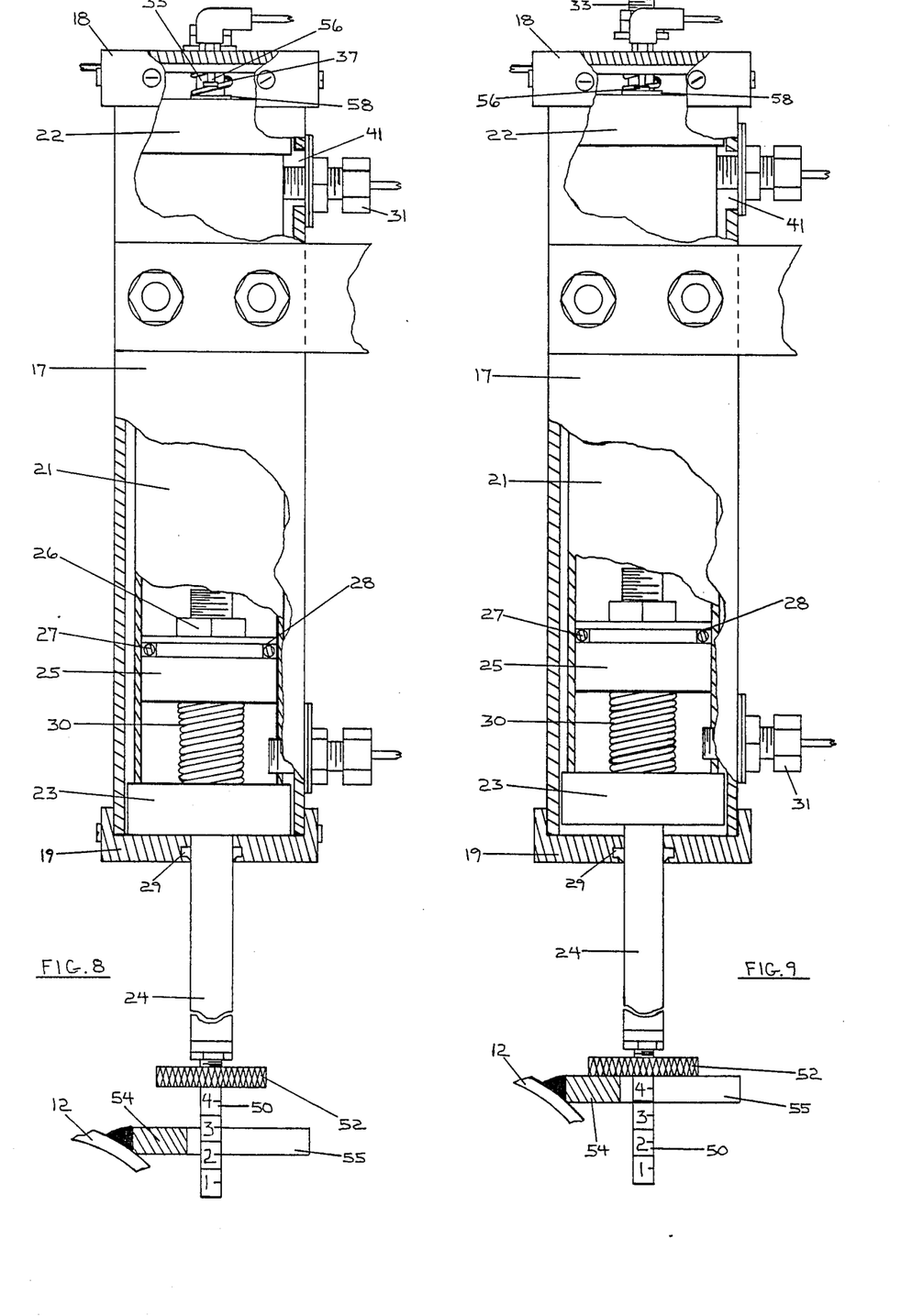
FIG. 9 is a side view with a partial cutaway of the indicator device of FIG. 2 when a full load is experienced and the probe is extended.

FIGS. 7 and 8 show the position of piston rod 24 and indicator stop 50 when part loads are exerting their weight on the axle and the indicator device is operable. As evident, the load forces being depicted in FIG. 7 are less than that depicted in FIG. 8. Sufficient air pressure is provided to the sliding cylinder 21 to cause piston 25 downward which in turn forces piston rod 24 to fully extend itself from the cylinder. As apparent, the shoulder 52 of the indicator stop 50 has not reached the axle mounted permanent stop 53. However, in FIG. 8 the calibrated portion of the indicator stop has extended partially through the open-sided slot 55 in permanent stop 53. The calibrations on the indicator stop are an indication to the motor vehicle operator of the amount of additional weight which can be added before the axle weight limit is exceeded. The sliding cylinder 21 rests in the lower part of the housing's slotted holes 41 in this mode.

FIG. 9 depicts the indicator device when operable and an excess load is encountered. Thus shoulder 52 of the indicator stop 50 abuts against the axle-mounted permanent stop 53. This causes fully extended piston rod 24 to force sliding cylinder 21 upwardly in the housing 17 until the threaded rods 43 and 44 are restrained from further movement by the top of the slotted openings. In this position, the contact plate 58 rides upwardly with the sliding cylinder 21 and touches the contact studs 56 on the underside of the top cover 18. An alarm is activated signaling the overweight condition. When the air pressure is removed, coil spring 30 causes the piston rod to retract into the cylinder and coil spring 37 causes the sliding cylinder to slide back to a rest position defined by the lower part of the slotted openings 41.

When contact plate 58 touches contact studs 56, an electrical circuit is completed. Current is directed to an alarm (not shown) to signal that the pre-set load limit has been reached. An audible alarm, e.g. a bell or buzzer or a visual alarm is set-off. Such alarms are very common and any commercially available alarm can be used. Normally, the alarm means is positioned in the motor vehicle's cab.

FIG. 10 shows a schematic wiring diagram used with the load indicator device. Wires 60 and 61 lead from a negative pole and a positive pole of a battery 62 to the electrical switch. The electrically operated alarm means 63 is connected into the circuit so that when the circuit is completed, it will be activated. An alarm switch 64 is also provided to deactivate the alarm means 63 if desired. Also shown in FIG. 10 is an optional air hose 65 extending from threaded rod 44 to an opening in top cover 18 opposite contact studs 56 and contact plate 58. When compressed air forces movement of the piston, ambient air is forced out rod 44 and through air hose 65. The short blast of air serves the purpose of clearing the contact studs and plate. In-line control valve 66 and an air supply source 67 supply compressed air through line 68 to the cylinder.

Figure 11:
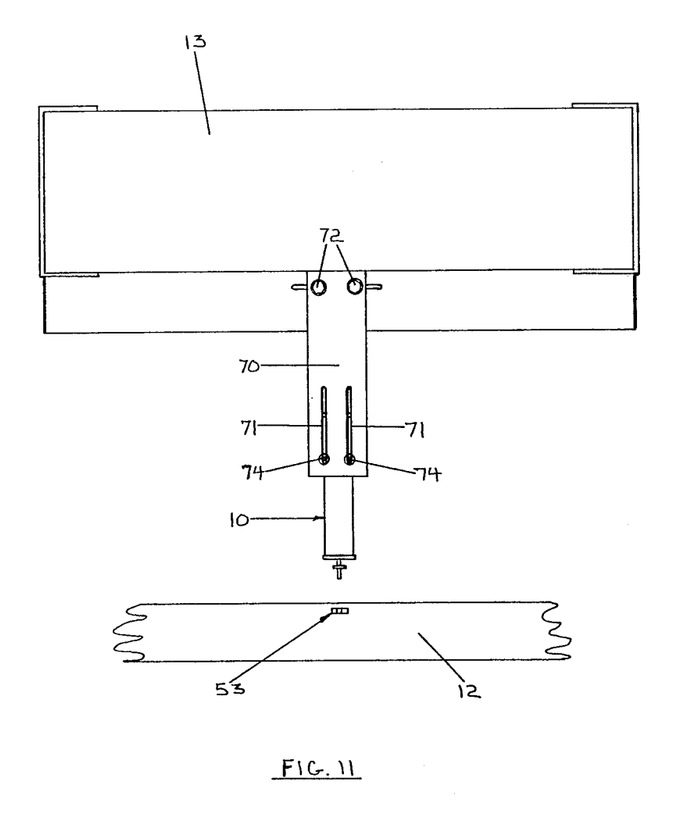
FIG. 11 is a front view of bracket attachment means used for attaching the indicator device to a motor vehicle.
Figure 12:
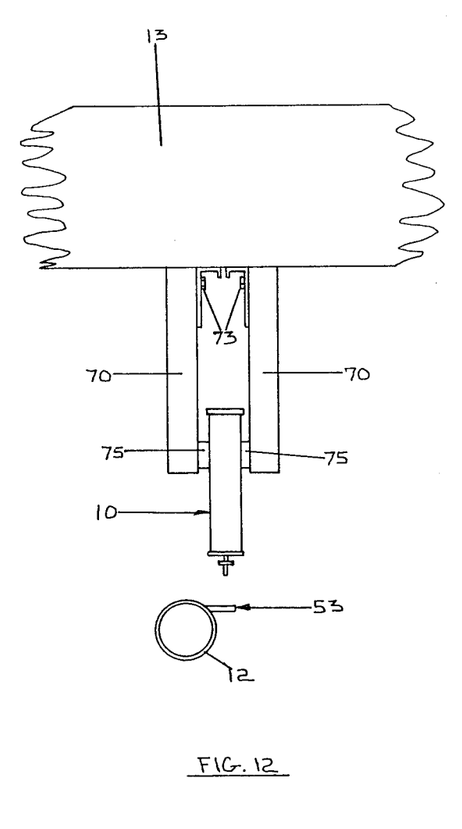
FIG. 12 is a side view of the bracket attachment means of FIG. 11.

The load indicator device is readily installed on a motor vehicle. An embodiment shown in FIGS. 11 and 12 depicts an elongated double bracket 70 initially secured to the underside of the frame 13 of the motor vehicle by bolts 72 and nuts 73. Each bracket 70 has two sets of slots 71 extending lengthwise. Bolts 74 extend through the respective slots and holes provided in the indication device's housing. Spacers 75 maintain the indicator device 10 in a spaced relationship with the brackets 70. Vertical movement of the indicator device for adjustment purposes is readily accomplished by loosening bolts 74, positioning the indicator device 10 and retightening bolts 74. Generally, the device is located at the mid-point of the axle spread. With the maximum load placed over the axle, an air hose is connected to the sliding cylinder and turned on. This forces the piston rod to its full stroke. Next, the indicator stop is screwed into its full adjustment retreat. The axle-mounted permanent stop is now attached and the indicator stop's length adjusted by screwing it out of the piston rod until the shoulder abuts against the permanent stop and the contact studs and plate touch. The jam nut 51 is now tightened to retain this position.

In operation, the load indicator device is first activated by supplying air pressure through the air hose to the cylinder. The motor vehicle is loaded. As the weight forces are transmitted throught the leaf spring, the vehicle's bed gradually drops. This lowers the piston rod until eventually the shoulder of the indicator stop makes contact with the permanent stop. Continued loading will cause the sliding cylinder to move upwardly in the housing's slotted openings until the contact studs and contact plate touch. When this happens, the electric circuit is completed and the alarm is activated.

Figure 13:
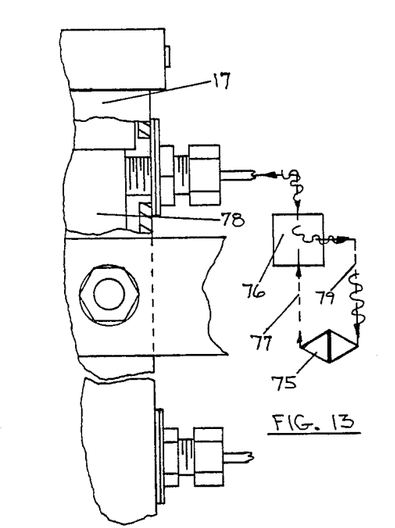
FIG. 13 is a schematic drawing of the indicator device of this invention wherein an alternative hydraulic activated probe is depicted.
Figure 14:
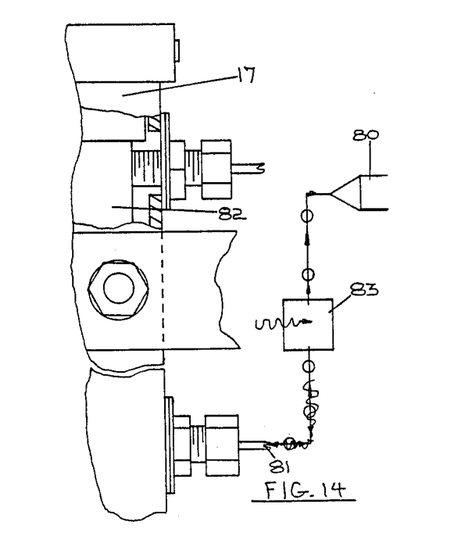
FIG. 14 is a schematic drawing of the indicator device of this invention wherein a vacuum activated probe is depicted.

FIGS. 13 and 14 illustrate alternative sources for moving the piston rod. Thus, in FIG. 13 hydraulic pressure is transmitted from a hydraulic pump and reservoir 75 through control valve 76 and line 77 into a hydraulic cylinder 78. In FIG. 14, a vacuum source 80 such as an intake manifold of the engine supplies vacuum through a line 81 to the cylinder 82. A push-pull control valve 83 is positioned in-line. In both cases, operation of the piston rod is the same as with respect to the air pressure source used in the device described with reference to FIGS. 2-9.

Figure 15:
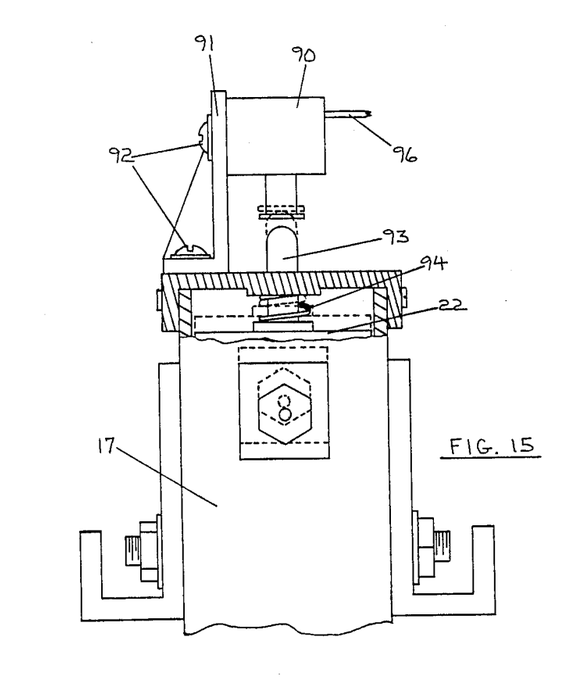
FIG. 15 is a fragmentary side view of an indicator device of this invention showing the use of a micro switch.
Figure 16:
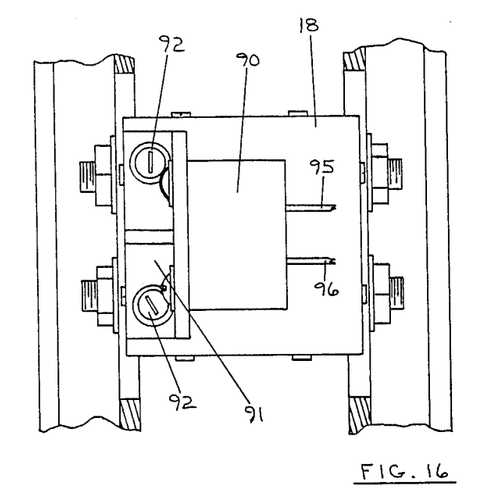
FIG. 16 is a top view of the indicator device of FIG. 15.

FIGS. 15 and 16 show another electrical switch useful with the indicator device of this invention. A micro switch 90 is mounted to the top cover 18 of the indicator device by use of a bracket 91 and self-threading screws 92. Finger plunger 93 is mounted on cylinder top 22 and extends through an opening in top cover 18 so as to be in alignment with an opening in the micro switch. A coil spring 94 is positioned over the finger plunger 93 to contact the top cover 18 and cylinder top 22 when in a rest position. Electric wires 95 and 96 lead from the micro switch to a power source. Operation of the indicator device is similar to that described with reference to FIGS. 2-9. Thus, an overload will cause cylinder 21 to ride up in housing 17 until stopped by the top of the slotted recesses. This causes finger plunger 93 to rise until it makes contact with the micro switch and completes an electric circuit. Coil spring 94 forces cylinder 21 to a rest position when the probe is retracted thereby breaking the electric circuit.

While the invention has been described with particular reference to the drawings, it should be apparent various modifications can be made without departing fronm the spirit of the invention. Thus, other electrical switches, including optic switches can readily be used as well as other conventional mounting and attachment means. Electrical switches with rheostats for an early warning of when a weight limit is being approached are beneficial. Stops mounted within the housing for limiting upward movement of the sliding cylinder beyond when the electrical circuit is completed prevents permanent damage to the indicator device itself. The use of the indicator device can also be for purposes other than signaling an overload situation. For example, a series of the devices mounted on all the axles of a motor vehicle can be used as an aid in evenly distributing a load over the vehicle's frame. Also premature signals from the device is a good indication springs on the motor vehicle have been weakened and need to be replaced. The claims which follow cover all obvious variations within their scope of coverage.

What is claimed is:

1. An axle weight load indicator device for detecting a pre-set load limit on a motor vehicle axle with the capability of eliminating false signals during movement of the motor vehicle, said device comprising:
   (a) a permanent stop mounted on the axle to prevent further movement when contacted;
   (b) a housing positioned on the motor vehicle to be in operable association with the permanent stop, said housing having an electrical switch associated therewith and a retractable probe, wherein the probe when used to detect the pre-set load limit extends from the housing a sufficient distance to contact the stop if the load limit has been exceeded and cause the electrical switch to complete an electrical circuit, yet said probe when not used retracts at least partially into the housing to ensure against false readings; and (c) alarm means connected to the electrical switch to signal when a pre-set load limit has been exceeded.

2. The device of claim 1 wherein the electrical switch comprises contact studs mounted on a top cover of the housing and a contact plate in movable association with the probe.

3. The device of claim 2 wherein the permanent stop extends outwardly from the axle.

4. The device of claim 3 wherein the permanent stop is a horizontally extruding plate with an open-sided slot for allowing the probe to pass therethrough prior to stopping further movement of the probe thereby providing a warning as to when the pre-set load limit is about to be exceeded.

5. The device of claim 4 wherein the probe has an indicator stop on one extremity which is calibrated to warn when the allowable axle weight limits are approached.

6. The device of claim 4 wherein the probe is mounted in a sliding cylinder which is positioned within the housing, said cylinder having the contact plate mounted on its top surface, further wherein the cylinder is urged towards the contact studs when the probe makes contact with the stop.

7. The device of claim 6 wherein the sliding cylinder is mounted in the housing by means of rods which are permanently secured to the cylinder and move in slotted receiving holes of the housing.

8. The device of claim 7 wherein the probe is air activated to an operable position.

9. The device of claim 7 wherein the probe is hydraulically activated to an operable position.

10. The device of claim 7 wherein the probe is vacuum activated to an operable position.

11. The device of claim 1 wherein the alarm means is mounted in a driver's area of the motor vehicle.

12. The device of claim 11 wherein the alarm means emits an audible sound when the pre-set load has been exceeded.

13. The device of claim 11 wherein the alarm means causes a light to shine when the pre-set load limit has been exceeded.

14. The device of claim 1 wherein the probe is housed within a one way, spring return air cylinder.

15. The device of claim 1 wherein the electrical switch is a micro switch with a spring-loaded finger plunger mounted to the top of a sliding cylinder positioned within the housing.

16. The device of claim 1 wherein the electrical switch and housing are attached to a J channel permanently attached to the frame of the motor vehicle.

* * * * *